US012586288B2

(12) United States Patent
Yoon et al.

(10) Patent No.: US 12,586,288 B2
(45) Date of Patent: Mar. 24, 2026

(54) DEVICE AND METHOD FOR GENERATING DYNAMIC TEXTURE MAP FOR 3 DIMENSIONAL DIGITAL HUMAN

(71) Applicant: ELECTRONICS AND TELECOMMUNICATIONS RESEARCH INSTITUTE, Daejeon (KR)

(72) Inventors: Seung Uk Yoon, Daejeon (KR); Ki Nam Kim, Daejeon (KR); Tae Joon Kim, Sejong-si (KR); Seung Wook Lee, Daejeon (KR); Bon Woo Hwang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 188 days.

(21) Appl. No.: 18/544,111

(22) Filed: Dec. 18, 2023

(65) Prior Publication Data

US 2024/0203027 A1 Jun. 20, 2024

(30) Foreign Application Priority Data

Dec. 20, 2022 (KR) ........................ 10-2022-0179369
Oct. 30, 2023 (KR) ........................ 10-2023-0146446

(51) Int. Cl.
 *G06T 15/04* (2011.01)
 *G06T 5/50* (2006.01)
 (Continued)

(52) U.S. Cl.
 CPC ................ *G06T 15/04* (2013.01); *G06T 5/50* (2013.01); *G06T 5/77* (2024.01); *G06T 17/00* (2013.01);
 (Continued)

(58) Field of Classification Search
 CPC ..... G06T 15/04; G06T 17/00; G06T 2210/36; G06T 5/50; G06T 11/001; G06T 19/20;
 (Continued)

(56) References Cited

U.S. PATENT DOCUMENTS 10,650,564 B1 5/2020 Lin et al.
10,896,535 B2 1/2021 Li et al.
(Continued)

FOREIGN PATENT DOCUMENTS

CN 111445410 A 7/2020
EP 4089641 A1 11/2022
(Continued)

OTHER PUBLICATIONS

Ivan Petrov et al., "DeepFaceLab: Integrated, flexible and extensible face-swapping framework", arXiv:2005.05535v5 [cs.CV] Jun. 29, 2021.
(Continued)

*Primary Examiner* — Hau H Nguyen
(74) *Attorney, Agent, or Firm* — Rabin & Berdo, P.C.

(57) ABSTRACT

A device and a method for generating dynamic texture map for 3 dimensional digital human are disclosed. The method comprises generating high-quality images from low-quality images including a low-quality object; generating partial high-quality images including a high-quality object by replacing the low-quality object within the low-quality images with the high-quality object within the high-quality images; and generating a high-quality texture map for a 3D model corresponding to the high-quality object using the partial high-quality images.

10 Claims, 6 Drawing Sheets

(51) Int. Cl.
*G06T 5/77* (2024.01)
*G06T 17/00* (2006.01)

(52) U.S. Cl.
CPC ............... *G06T 2207/20021* (2013.01); *G06T 2207/30196* (2013.01)

(58) Field of Classification Search
CPC . G06T 2207/20021; G06T 2207/20221; G06T 2207/30196; G06T 5/77; G06F 3/04842; G06F 3/04845
See application file for complete search history.

(56) References Cited

U.S. PATENT DOCUMENTS

| | | | |
|---|---|---|---|
| 2003/0189983 A1* | 10/2003 | Hong | .................... H04N 19/523<br>348/700 |
| 2012/0299906 A1* | 11/2012 | Shiell | ...................... G06T 15/04<br>345/419 |
| 2015/0190716 A1 | 7/2015 | Evertt et al. | |
| 2018/0096511 A1 | 4/2018 | Beeler et al. | |
| 2022/0343583 A1* | 10/2022 | Sugano | .................... G06T 15/04 |

FOREIGN PATENT DOCUMENTS

| | | |
|---|---|---|
| KR | 101896137 B1 | 9/2018 |
| KR | 102068993 B1 | 1/2020 |

OTHER PUBLICATIONS

James Booth et al., '3D face Morphable Models "In-the-Wild"', arXiv:1701.05360v1 [cs.CV] Jan. 19, 2017.

Jiankang Deng et al., "UV-GAN: Adversarial Facial UV Map Completion for Pose-invariant Face Recognition", arXiv:1712.04695v1 [cs.CV] Dec. 13, 2017.

Koki Nagano et al., "paGAN: Real-time Avatars Using Dynamic Textures", ACM Transactions on Graphics, vol. 37, No. 6, Article 258. Nov. 2018.

Liwen Hu et al., "Simulation-Ready Hair Capture", Eurographics 2017, vol. 36 (2017), No. 2.

Seung-Uk Yoon et al, "Texture Map Generation from a Frontal View of Concept Art for 3D Clothes Modeling", 2019 Korean Software Conference Paper Collection, pp. 1046-1048.

Vladimir Iglovikov et al., "TernausNet: U-Net with VGG11 Encoder Pre-Trained on ImageNet for Image Segmentaion", arXiv:1801.05746v1 [cs.CV] Jan. 17, 2018.

* cited by examiner

410

420

DEVICE AND METHOD FOR GENERATING DYNAMIC TEXTURE MAP FOR 3 DIMENSIONAL DIGITAL HUMAN

CROSS REFERENCE TO RELATED APPLICATION

The present application is based on and claims the benefit of priority to Korean Patent Application Number 10-2022-0179369, filed on Dec. 20, 2022, and Korean Patent Application Number 10-2023-0146446, filed on Oct. 30, 2023 in the Korean Intellectual Property Office, the entire disclosure of which is incorporated herein by reference.

TECHNICAL FIELD

The present disclosure relates to a method and a device for generating a dynamic texture map for a digital human.

BACKGROUND

The following descriptions serve solely to provide the background information related to the present embodiment and do not constitute the prior art.

With the increasing popularity of the metaverse environment, there is a growing interest in digital humans, which are one of the key elements constituting the metaverse. A digital human within the metaverse may function as a user's virtual avatar or as a counterpart avatar that communicates with, reacts to, and acts with the user. The demand for 3D content is rapidly increasing due to the increase in virtual and augmented reality applications, including games and animation using 3D computer graphics.

Most conventional digital human avatars are based on 3-dimensional (3D) character models, allowing users to customize their shape as desired. While the conventional digital humans exhibited low reality or presence, recent advances in real-time rendering technology have led to improved quality in the shape of characters.

Three-dimensional (3D) graphics systems utilize texturing or texture mapping techniques to obtain more realistic images. Texturing or texture mapping means applying a two-dimensional (2D) image onto the surface of a 3D object to impart a texture to the surface of the 3D object. The surface of a 3D model unfolded onto a 2D plane is called a texture map.

To obtain high-quality rendered image frames, high-quality texture maps are required. In particular, a high-quality video requires a high-quality dynamic texture map composed of texture maps that evolve over time. To generate realistic dynamic texture maps, various studies are being conducted, including research on deepfake technology and Generative Adversarial Network (GAN)-based facial image generation.

However, texturing is an important design element determining the 3D rendering performance and may consume a significant portion of the overall processor power. Since memory access due to texturing also affects memory bandwidth and memory power, texturing may be a major cause of a bottleneck between the processor and memory. Therefore, a method for creating a high-quality texture map requires considerable time and cost for 3D object model generation and texturing and involves expensive 3D graphics rendering hardware.

Therefore, there is a need to explore methods for generating realistic, high-quality texture maps that require fewer resources and incur less cost within less time.

SUMMARY

According to at least one embodiment, the present disclosure provides a method including generating high-quality images from low-quality images including a low-quality object; generating partial high-quality images including a high-quality object by replacing the low-quality object within the low-quality images with the high-quality object within the high-quality images; and generating a high-quality texture map for a 3D model corresponding to the high-quality object using the partial high-quality images According to another embodiment of the present disclosure provides a device for generating a high-quality texture map for a digital human comprising at least one memory storing computer-executable instructions; and at least one processor. Wherein the at least one processor is configured to execute the computer-executable instructions to generate high-quality images from low-quality images including low-quality objects; generate partial high-quality images including a high-quality object by the low-quality object within the low-quality images with a high-quality object within the high-quality images, and generate a high-quality texture map for a 3D model corresponding to the high-quality object using the partial high-quality images.

DETAILED DESCRIPTION

Figure 1:
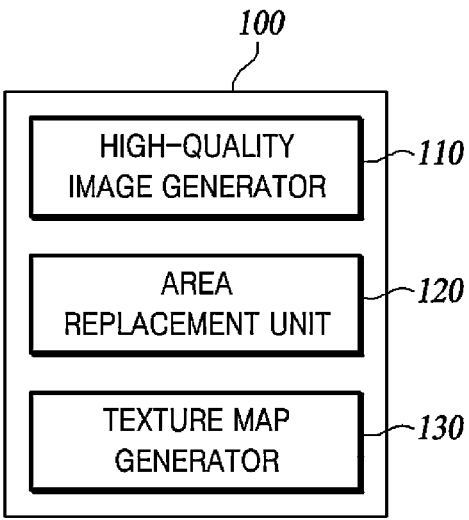
FIG. 1 is a structure of a generating device according to one embodiment of the present disclosure.

One object of the present disclosure is to provide a device and a method for generating a high-quality dynamic texture map with reality and presence from low-quality rendered images in a resource-constrained environment.

One object of the present disclosure is to provide a device and a method for further generating 3D models corresponding to dynamic texture maps.

Technical objects to be achieved by the present disclosure are not limited to those described above, and other technical objects not mentioned above may also be clearly understood from the descriptions given below by those skilled in the art to which the present disclosure belongs.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

The following detailed description, together with the accompanying drawings, is intended to describe exemplary embodiments of the present disclosure and is not intended to represent the only embodiments in which the present disclosure may be practiced.

In the present disclosure, image quality relates to the reality and presence that a person may feel with the naked eye, which may be determined by various factors such as image resolution, color, texture, and light reflection. Meanwhile, the quality of a 3D model may be based on the number of vertices of the 3D model. A low-quality image may be referred to as a first image, and a high-quality image may be referred to as a second image.

In the present disclosure, the surface of a 3D model unfolded onto a 2D plane is referred to as a texture map. A texture map expresses the color and texture of the surface of a 3D model. In other words, the texture map may be overlaid on the surface of the 3D model. Dynamic texture maps represent texture maps varying over time. A low-quality texture map may be referred to as a first texture map, and a high-quality texture map may be referred to as a second texture map.

FIG. 1 is a structure of a generating device according to one embodiment of the present disclosure.

Referring to FIG. 1, a structure of a device for generating a dynamic texture map for a 3D digital human model (in what follows, a generating device 100) is shown.

The generating device 100 creates a high-quality dynamic texture map using low-quality rendered images within a video without using both a high-quality 3D model and a high-quality texture map. At this time, the generating device 100 may generate a high-quality dynamic texture map using only a small number of computational resources.

The generating device 100 may be used for a real-time metaverse application that utilizes 3D characters.

The generating device 100 includes a high-quality image generator 110, an area replacement unit 120, and a texture map generator 130.

The generating device 100 may include at least one processor and a memory storing at least one command and may perform functions of the high-quality image generator 110, the area replacement unit 120, and the texture map generator 130 through execution of commands by at least one processor. The generating device 100 may further include a communication unit for communication with an external device.

The high-quality image generator 110 receives low-quality images in an input video and generates high-quality images from the low-quality images.

Here, the low-quality images refer to 2D rendered images including low-quality target objects. In particular, the low-quality images are images rendered using the shape of a 3D model and a low-quality texture map.

The low-quality object may refer to an instance of a person, a character, or an item.

In one embodiment, the low-quality images may be key frame images representing images at a time point when the facial expression, posture, or key part of a target object begins to change among images in the video. In this case, one texture map may be generated from one low-quality image. When the low-quality images are key frame images, the generating device 100 only needs to process key images rather than the entire set of images in the video, which reduces the number of computations and time required to generate a dynamic texture map. In another embodiment, low quality images are not limited to key frame images but may indicate the entire rendered images.

The high-quality image generator 110 may generate high-quality images through realistic visualization of low-quality images. The realistic visualization improves the image quality of a target object while maintaining the identity of the target object within the low-quality images.

The high-quality image generator 110 may generate high-quality images from low-quality images using a deep neural network model.

In one embodiment, the high-quality image generator 110 may use a realistic image generator and an image quality restorer trained with various errors in the form of a generative adversarial network (GAN) to generate high-quality images. The image quality restorer extracts features from the input image, and the realistic image generator creates a high-quality image based on the extracted features.

The realistic image generator and the image quality restorer are updated based on various errors.

After training is completed, the image quality restorer and the realistic image generator may restore high-quality images from low-quality images.

The realistic image generator or the image quality restorer may adopt the U-Net architecture, which employs an end-to-end model based on fully convolutional networks mainly used for image segmentation. However, the scope of the present disclosure is not limited to the structure of the neural network above, which may be replaced with a neural network structure that provides the same function as needed.

In addition, the high-quality image generator 110 may generate high-quality images using various deep neural network models.

High-quality images contain high-quality objects, and high-quality objects in the high-quality images have the same location and the same movement as low-quality objects in low-quality images. As described above, low-quality images and high-quality images have a corresponding relationship with each other.

The area replacement unit 120 replaces low-quality objects in low-quality images with high-quality objects in high-quality images to generate partial high-quality images including high-quality objects.

Specifically, the area replacement unit 120 separates low-quality objects in low-quality images from the low-quality background and separates high-quality objects in high-quality images from the high-quality background. The area replacement unit 120 applies a corresponding part of the high-quality object to the position of at least a part of the low-quality object. In other words, the area replacement unit 120 replaces at least a part of the low-quality object with a corresponding part area of the high-quality object. The area replacement unit 120 may enable seamless integration of the boundaries of high-quality objects with the background of low-quality images.

When the target object is a person or a character, the area replacement unit 120 may replace low-quality objects in low-quality images with high-quality objects using a face separation algorithm and a face replacement algorithm. For example, the area replacement unit 120 may separate and replace the eyes, nose, mouth, ears, hair, and face all at once. In another example, the area replacement unit 120 may independently separate and replace the eyes, nose, mouth, ears, hair, and face.

The partial high-quality images may include high-quality objects of high-quality images and the low-quality background of low-quality images.

The texture map generator 130 generates a high-quality texture map for a 3D model corresponding to a high-quality object using partial high-quality images.

In particular, since partial high-quality images form a time-varying image sequence, the texture map generator 130 may generate a high-quality dynamic texture map from partial high-quality images. In what follows, the operation of generating one high-quality texture map from one partial high-quality image is described.

In one embodiment, since a 3D model and a texture map for a high-quality object are not given, the texture map generator 130 generates a 3D model using the high-quality object and 3D template models and then creates a dynamic texture map of the 3D model.

At this time, the texture map generator 130 generates the shape and texture map of the 3D model by projecting the 3D template models onto partial high-quality images.

First, the texture map generator 130 uses 3D template models with predefined shapes and poses and partial high-quality images to generate a 3D model in which a high-quality object within the partial high-quality images is applied as a partial texture map. The generated 3D model has the same shape and pose as a high-quality object. The colors and textures of high-quality objects are expressed on the visible surface of the 3D model.

The texture map generator 130 separates the generated 3D model into the shape and a partial texture map of the 3D model. The shape of the 3D model refers to a 3D representation of the 3D model. The partial texture map is a texture map expressing only the visible area of a high-quality object in the partial high-quality images. An empty area of the partial texture map may be filled with noise.

The texture map generator 130 generates a complete texture map by inpainting the empty area of the partial texture map. For example, the texture map generator 130 may restore a complete texture map using a trained deep neural network.

A complete texture map captures the color, texture, and other characteristics of the entire surface of the 3D model and may cover the outer shape of the 3D model.

The texture map generator 130 may generate a dynamic texture map including a plurality of texture maps by generating a high-quality texture map from each of the partial high-quality images.

Like the operations described above, the generating device 100 may generate a dynamic texture map of a 3D digital human from low-quality 2D rendered images. In contrast to conventional pipelines that rely on a high-quality 3D model to generate a dynamic texture map, the generating device 100 uses 2D, low-quality rendered images, which may create a photorealistic dynamic texture map with realistic visualization with low resources and cost.

Meanwhile, in another embodiment, a 3D model's shape and low-quality texture map may be given. The generating device 100 generates a high-quality dynamic texture map for the 3-D model using images rendered from the 3D model's shape and low-quality texture map. In the same way as the embodiment in which a 3D model's shape and texture map are not given, since the generating device 100 uses the shape and texture map of the 3D model, it is possible to generate a high-quality dynamic texture map using only a small number of computational resources.

Specifically, low-quality images including a low-quality object are generated by rendering a low-quality 3D model shape and a low-quality texture map.

The high-quality image generator 110 in the generating device 100 generates high-quality images through realistic visualization or restoration of low-quality images, and the area replacement unit 120 generates high-quality images by performing area replacement between low-quality images and high-quality images.

The texture map generator 130 generates high-quality texture maps for the 3D model by applying partial high-quality images to the low-quality texture map. The texture map generator 130 generates a high-quality texture map by substituting parts of a high-quality object in each high-quality image to the corresponding parts in the low-quality texture map. Since the texture map generator 130 knows a mapping relationship between the shape of the 3D model and the low-quality texture map and a mapping relationship between the shape of the 3D model and low-quality images, a high-quality object may be easily applied to the low-quality texture map using the mapping relationships. The texture map generator 130 may use a mapping relationship between parts in a low-quality texture map and parts of a high-quality object.

Figure 2:
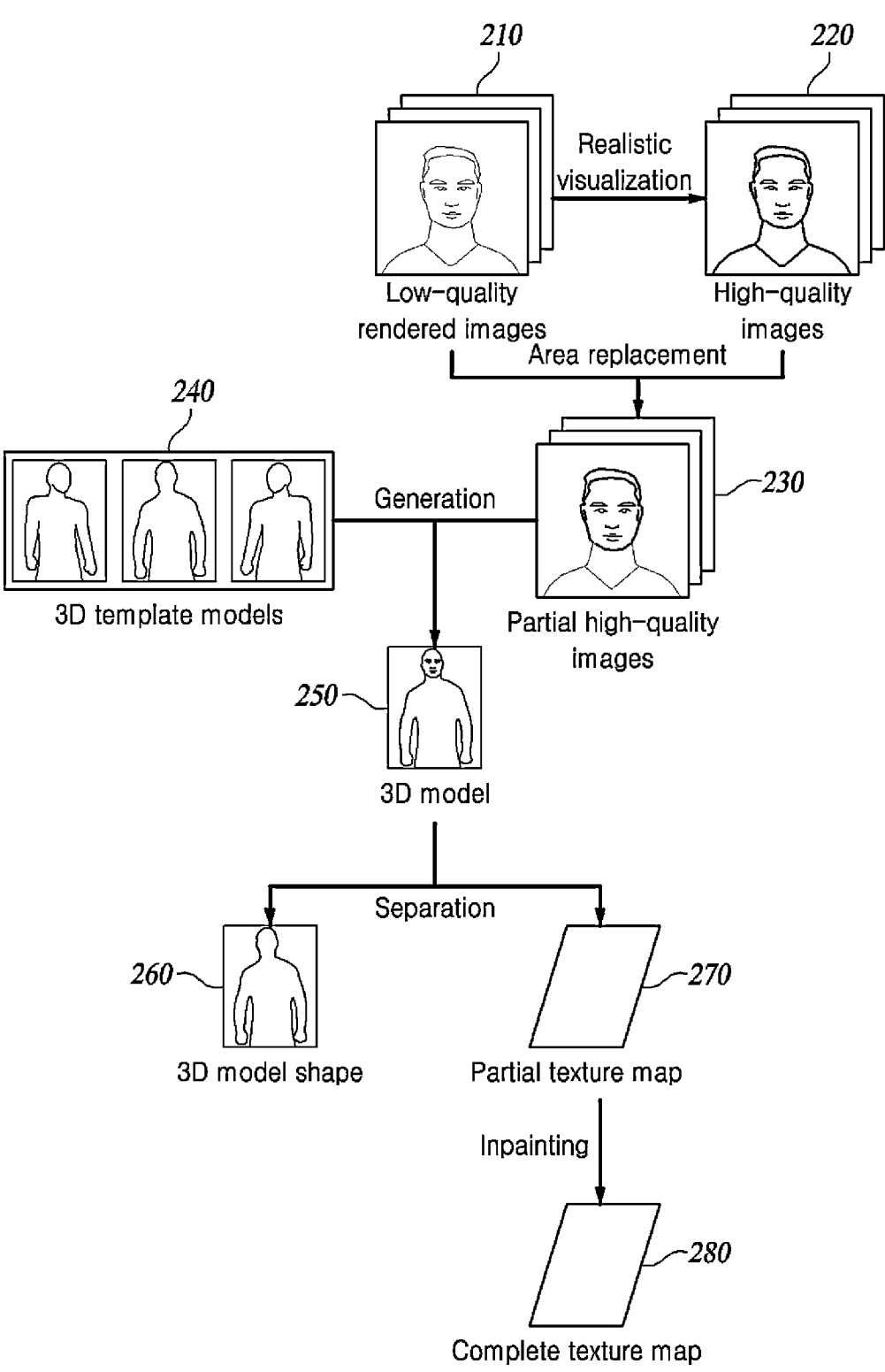
FIG. 2 illustrates a process for generating a texture map according to one embodiment of the present disclosure.

FIG. 2 illustrates a process for generating a texture map according to one embodiment of the present disclosure.

Referring to FIG. 2, low-quality rendered images 210 are provided to the generating device as input data, but a 3D model or a texture map is not provided.

First, the generating device obtains low-quality rendered images 210. The low-quality rendered images 210 include a low-quality human object. The low-quality rendered images 210 may be key frame images among the entire rendered images.

The generating device generates high-quality images 220 through realistic visualization of low-quality rendered images 210. The high-quality images 220 include a high-quality human object.

The generating device may convert low-quality rendered images 210 to high-quality images 220 using a trained deep learning model. For example, the generating device may use a trained, high-resolution model.

The generating device generates partial high-quality images 230 including high-quality objects by replacing low-quality objects within the low-quality images 210 with high-quality objects within the high-quality images 220. Specifically, the generating device separates a low-quality object from the background of the low-quality images 210, separates a high-quality object from the background of the high-quality images 220, and replaces at least a part of the low-quality object with a corresponding part of the high-quality object. Through this operation, partial high-quality images 230 are generated.

For example, the generating device may substitute the face part of a human object within the high-quality images 220 into the face part of a human object within the low-quality rendered images 210. Accordingly, the face of the human object within the partial high-quality images 230 may be expressed in high quality while the body may still be expressed in low-quality.

Afterward, the generating device renders the high-quality object within each partial high-quality image to generate a 3D model 250 corresponding to the high-quality object and generates a high-quality texture map for the 3D model 250.

In one embodiment, the generating device utilizes 3D template models 240. Specifically, the generating device linearly combines the 3D template models 140 to generate a 3D model 250 with the same shape and pose as the high-quality object within the partial high-quality images 230 and with a partial texture map related to the high-quality object. For example, by adjusting the combination ratio among template models facing the left, the front, and the right, a 3D model facing the front may be created. At this time, the high-quality objects within the partial high-quality images 230 are applied as partial texture maps to the 3D model 250.

The texture map generator 130 separates the 3D model 250 into a 3D model shape 260 and a partial texture map 270 of the 3D model. Here, the partial texture map 270 expresses color, texture, and other characteristics of the visible area of a high-quality object in the partial high-quality images 230. Occluded parts of the high-quality object in the partial texture map 270 may be filled with noise.

The generating device generates a complete texture map 280 by inpainting occluded parts of the high-quality object in the partial texture map 270. To perform inpainting, a deep learning model trained for inpainting or a well-known algorithm may be used.

The complete texture map 280 is a high-quality 2D image that may cover the whole of the 3D model shape 260. The complete texture map 280 constitutes part of the dynamic texture map.

As described above, a high-quality dynamic texture map may be generated from low-quality rendered images 210. In other words, the generating device may generate a high-quality texture map and the 3D model shape 260 to which the high-quality texture map is to be applied from low-quality rendered images 210 using only a small number of computational resources.

Figure 3:
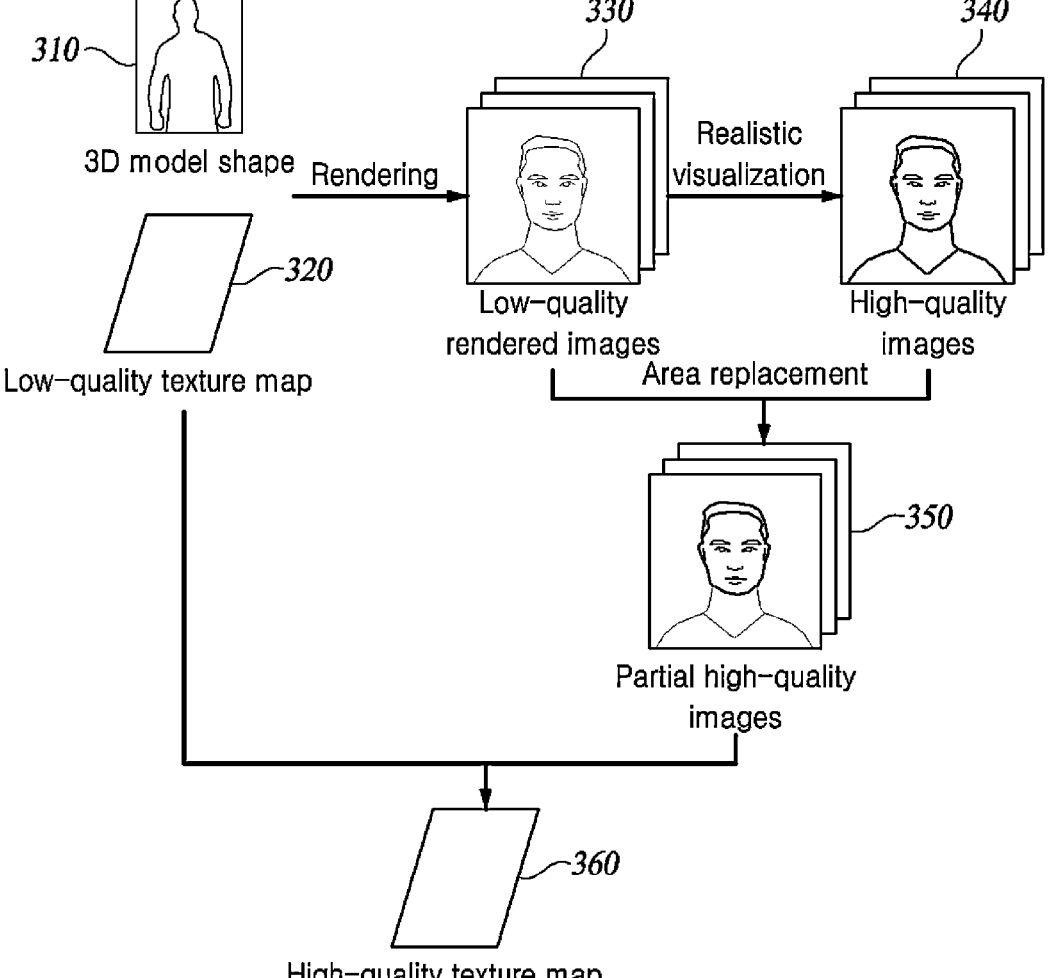
FIG. 3 illustrates a process for generating a texture map according to another embodiment of the present disclosure.

FIG. 3 illustrates a process for generating a texture map according to another embodiment of the present disclosure.

Referring to FIG. 3, a 3D model shape 310, a low-quality texture map 320, and low-quality rendered images 330 are provided to the generating device as input data. The low-quality rendered images 330 are the images obtained by rendering the 3D model shape 310 and the low-quality texture map 320 for the 3D model.

The generating device obtained the low-quality rendered images 330. The low-quality rendered images 330 include a low-quality human object. The low-quality rendered images 330 may be key frame images among the entire rendered images.

The generating device generates high-quality images 340 through realistic visualization of the low-quality rendered images 330. The high-quality images 340 include the high-quality human object.

The generating device may convert low-quality rendered images 330 to high-quality images 340 using a trained deep learning model. For example, the generating device may use a trained, high-resolution model.

The generating device generates partial high-quality images 350 including high-quality objects by replacing low-quality objects within the low-quality images 330 with high-quality objects within the high-quality images 340. Specifically, the generating device separates a low-quality object from the background of the low-quality images 330, separates a high-quality object from the background of the high-quality images 340, and replaces at least a part of the low-quality object with a corresponding part of the high-quality object. Through this operation, partial high-quality images 350 are generated.

When 3D model and animation information is given, the generating device may easily separate the desired parts (e.g., hair, face, or eyes) by applying a predefined tag or annotation to each part of the 3D model and then performing rendering of the tagged 3D model. Specifically, the generating device may tag parts such as eyes, nose, and mouth on the 3D model shape 310, render the tagged 3D model, and obtain a rendered image in which each tagged part is displayed. The area corresponding to each part (eyes, nose, mouth, and so on) of the rendered image may be identified from the low-quality rendered images 330 or the high-quality images 340 as a separation target area.

For example, the generating device may substitute the face part of a human object within the high-quality images 340 into the face part of a human object within the low-quality rendered images 330. Accordingly, the face of the human object within the partial high-quality images 350 may be expressed in high quality while the body may still be expressed in low-quality.

Afterward, the generating device generates a high-quality texture map 360 by applying a high-quality object within each partial high-quality image to the low-quality texture map 320.

Specifically, the generating device may substitute at least part of a high-quality object within the partial high-quality images 350 into the corresponding part area within the low-quality texture map 320 based on at least one mapping relationship among a mapping relationship between a low-quality object within the low-quality images 330 and the low-quality texture map 320, a mapping relationship between the low-quality object and the high-quality object, or a mapping relationship between each part of the low-quality texture map 320 and each part of the high-quality object.

At this time, the generating device may calculate the mapping relationship between the low-quality texture map 320 and the high-quality object within the partial high-quality images 350 using the mapping relationships.

The high-quality texture map 360 is a texture map for the 3D model shape 310. At least part of the high-quality texture map 360 is a high-quality image area compared to the low-quality texture map 320.

The generating device may generate additional high-quality texture maps from other partial high-quality images.

The generating device uses a dynamic texture map including a plurality of high-quality texture maps as a dynamic texture map of the 3D model shape 310.

As described above, a high-quality dynamic texture map may be generated from the 3D mode shape 310, the low-quality texture map 320, and the low-quality rendered images 330. In other words, the generating device may generate the high-quality texture map 360 using a small number of computational resources.

Figure 4:
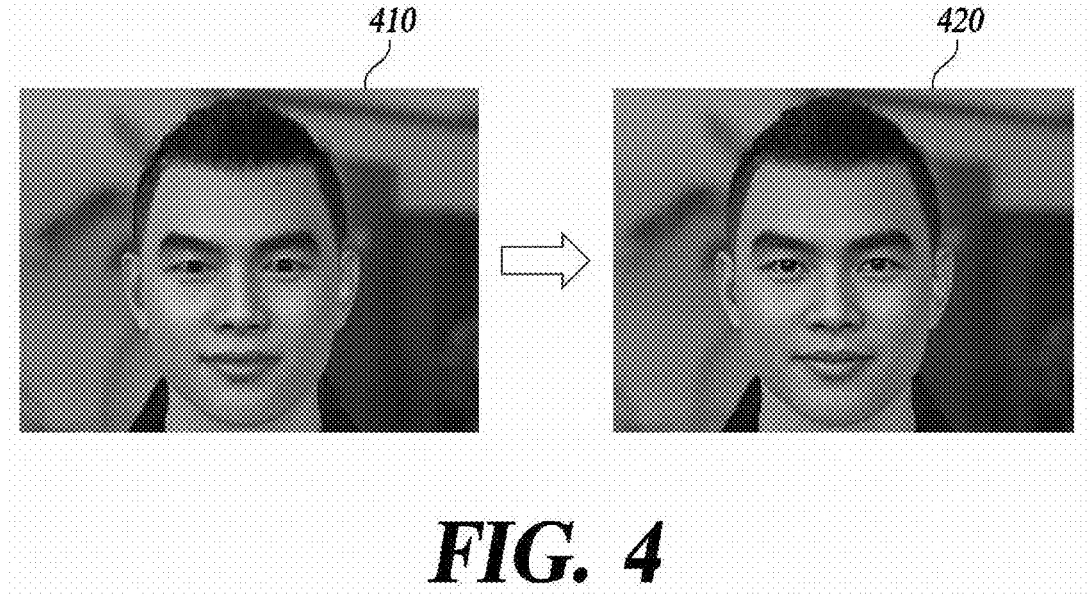
FIG. 4 illustrates a comparison between low-quality images and high-quality images according to one embodiment of the present disclosure.

FIG. 4 illustrates a comparison between low-quality images and high-quality images according to one embodiment of the present disclosure.

Referring to FIG. 4, a low-quality image 410 including a low-quality object and a high-quality image 420 including a high-quality object are shown. The low-quality object and the high-quality object represent a character in the form of a human face.

The generating device generates a high-quality image 420 through realistic visualization of the low-quality image 410. The generating device may improve the quality of the low-quality image 410 using a GAN, a restoration model, a high-resolution model, or a realistic image generator. The generating device may improve only the front scene excluding the background within the low-quality image 410, namely, the quality of the low-quality object.

The face of the low-quality object within the low-quality image 410 is blurry throughout the entire facial area. Meanwhile, the face of the high-quality object within the high-quality image 420 is clear and realistic.

The generating device may generate high-quality images by performing realistic visualization on the entire input low-quality rendered images.

Figure 5:
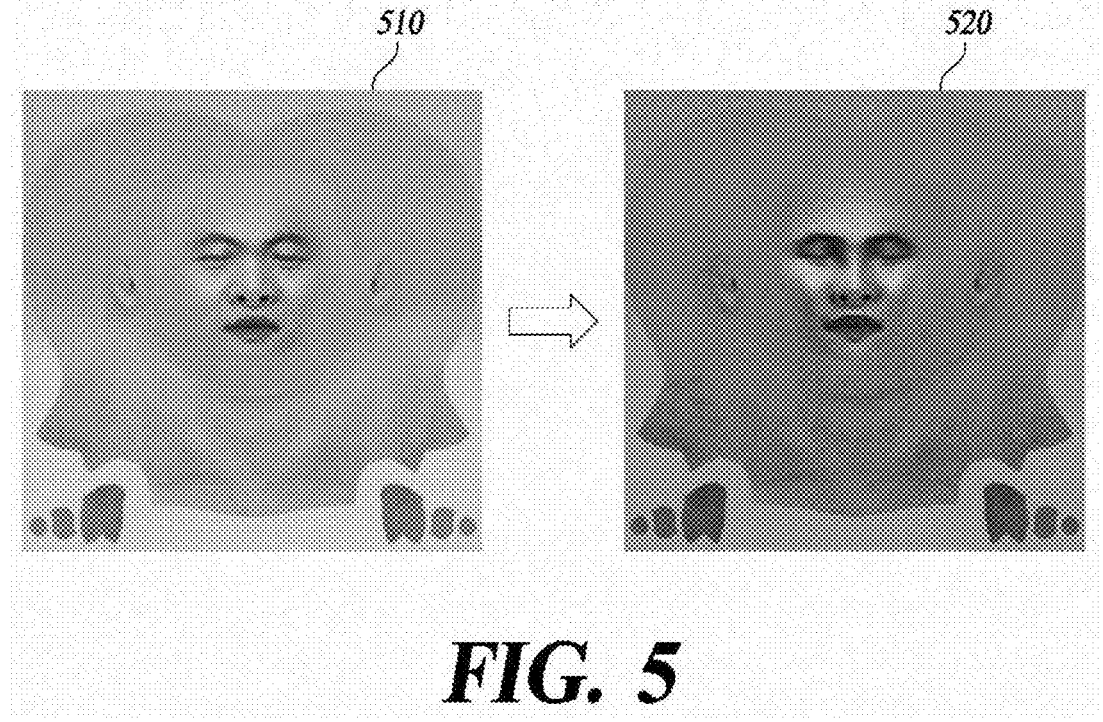
FIG. 5 illustrates a comparison between a high-quality texture map and a low-quality texture map according to one embodiment of the present disclosure.

FIG. 5 illustrates a comparison between a high-quality texture map and a low-quality texture map according to one embodiment of the present disclosure.

Referring to FIG. 5, a low-quality texture map 510 and a high-quality texture map 520 are shown. The two texture maps relate to the face and head of a human.

The generating device may create a high-quality texture map 520 from a low-quality texture map 510 using a partial high-quality image generated through area substitution between a low-quality image and a high-quality image.

The generating device may generate a high-quality texture map 520 by replacing each part of the low-quality texture map 510 with the corresponding part of the high-quality object using a correspondence relationship between the high-quality object within the partial high-quality image with the low-quality texture map 510.

The low-quality texture map 510 exhibits unnatural boundaries for each part, accompanied by unnatural contrast, saturation, and other features.

On the other hand, on the high-quality texture map 520, the boundaries of each part are natural, with more realistic contrast and saturation compared to the low-quality texture map 510.

Figure 6:
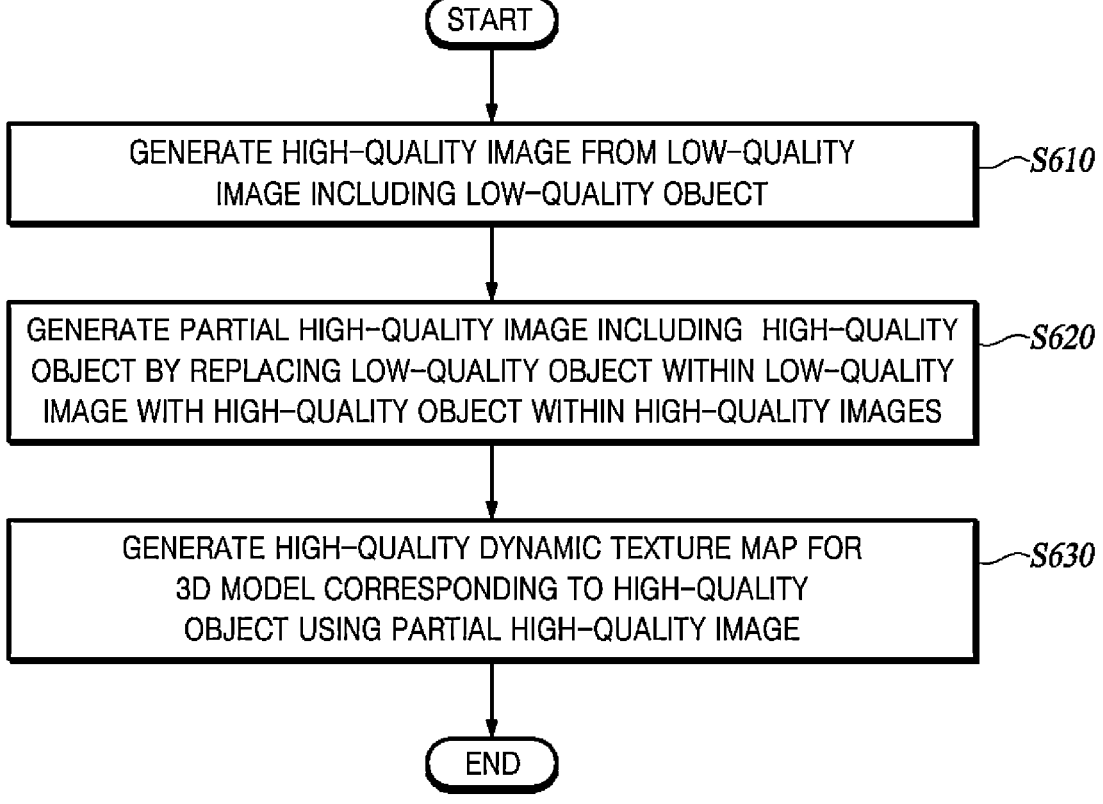
FIG. 6 is a flow diagram of a method for generating a dynamic texture map according to one embodiment of the present disclosure.

FIG. 6 is a flow diagram of a method for generating a dynamic texture map according to one embodiment of the present disclosure.

Referring to FIG. 6, the generating device generates high-quality images from low-quality images including a low-quality object S610.

Here, low-quality images may indicate key frame images among rendered images.

The generating device generates partial high-quality images including high-quality objects by replacing low-quality objects within the low-quality images with the high-quality objects within the high-quality images S620.

Specifically, the generating device generates partial high-quality images by separating a low-quality object from the background of the low-quality images, separating a high-quality object from the background of the high-quality images, and replacing at least a part of the low-quality object with a corresponding part of the high-quality object.

The generating device generates a high-quality texture map for a 3D model corresponding to the high-quality object using the partial high-quality images S630.

Specifically, the generating device generates a 3D model with the same shape and pose as the high-quality object within the partial high-quality images and with a partial texture map representing the high-quality object. The generating device separates the 3D model into the shape and the partial texture map. The generating device generates a complete texture map by performing inpainting on the partial texture map. The complete texture map is a high-quality texture map.

Meanwhile, according to another embodiment, a 3D model's shape and low-quality texture map may be given.

Low-quality images are obtained by rendering the 3D model's shape and the low-quality texture map for the 3D map.

In this case, the generating device may generate a high-quality texture map using the 3D model and the low-quality texture map provided together with the partial high-quality images. The generating device may generate a high-quality texture map by applying a high-quality object to the low-quality texture map based on a mapping relationship between each part of the low-quality texture map and each part of the high-quality object.

According to an embodiment of the present disclosure, a high-quality dynamic texture map exhibiting reality and presence may be generated from low-quality rendered images in a resource-constrained environment.

According to an embodiment of the present disclosure, 3D models corresponding to dynamic texture maps may be further generated.

The technical effects of the present disclosure are not limited to the technical effects described above, and other technical effects not mentioned herein may be understood to those skilled in the art to which the present disclosure belongs from the description below.

At least part of the constituting elements described in the exemplary embodiments of the present disclosure may be implemented using a hardware element including at least one of a digital signal processor (DSP), a processor, a controller, an application-specific IC (ASIC), a programmable logic device (e.g., FPGA), and other electronic components or a combination thereof. Also, at least some of the functions or processes described in the exemplary embodiments may be implemented using software, and the software may be stored in a recording medium. At least part of the constituting elements, functions, and processes described in the exemplary embodiments of the present disclosure may be implemented through a combination of hardware and software.

A method according to exemplary embodiments of the present disclosure may be implemented using a program that may be executed in a computer and may be implemented using various types of recording media, including a magnetic storage device, an optical recording medium, and a digital storage device.

Various techniques described in the present disclosure may be implemented using digital electronic circuitry, computer hardware, firmware, software, or combinations thereof. The implementations may be realized as a computer program tangibly embodied in a computer program product, i.e., an information carrier, e.g., a machine-readable storage device (computer-readable recording medium) or a radio signal for processing by or controlling the operation of a data processing device, e.g., a programmable processor, a computer, or a plurality of computers. Computer programs, such as the computer program(s) described above, may be written in any form of programming language, including compiled or interpreted languages, and may be written in any form including a stand-alone program or another unit suitable to be used in a module, a component, a subroutine, or a computing environment. The computer programs may be deployed for processing on one computer or multiple computers at one site or distributed across multiple sites and interconnected by a communications network.

Processors suitable for processing computer programs include, for example, both general-purpose and special-purpose microprocessors and any one or more processors of any type of digital computer. Typically, a processor will receive instructions and data from a read-only memory, a random access memory, or both. Elements of a computer may include at least one processor that executes instructions and one or more memory devices storing instructions and data. Generally, a computer may include one or more mass storage devices storing data, such as magnetic disks, magneto-optical disks, or optical disks, receive data from the mass storage devices, transmit data to the mass storage devices, or transmit and receive to and from the mass storage devices. Information carriers suitable for embodying computer program instructions and data include, for example, semiconductor memory devices; magnetic media such as hard disks, floppy disks, and magnetic tapes; optical media such as Compact Disk Read Only Memory (CD-ROM), Digital Video Disk (DVD); magneto-optical media such as floptical disk; Read Only Memory (ROM); Random Access Memory (RAM); flash memory; Erasable Programmable ROM (EPROM); and Electrically Erasable Programmable ROM (EEPROM). The processor and the memory may be supplemented by or included in special purpose logic circuitry.

The processor may execute an operating system and software applications executed on the operating system. Also, the processor device may access, store, manipulate, process, and generate data in response to the execution of software. For the convenience of understanding, the processor device may be described as being used as a single processor device, but it should be understood by those skilled in the art that the processor device includes multiple processing elements and/or multiple types of processing elements. For example, a processor device may include multiple processors or one processor and one controller. Also, other processing configurations, such as parallel processors, are possible.

Also, non-transitory computer-readable media may be an arbitrary available medium that may be accessed by a computer, which may include both a computer storage medium and a transmission medium.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

As described above, according to an embodiment of the present disclosure, a cloud-based system for cultivating roughage may enable a grower to cultivate roughage conveniently by remotely controlling a cultivation apparatus.

According to an embodiment of the present disclosure, the cloud-based system for cultivating roughage may enable a grower to control a cultivation apparatus in a cost-effective manner.

The effects of embodiments of the present disclosure are not limited to the above-mentioned effects, and other effects not mentioned will be clearly understood by those skilled in the art from the above description.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

Accordingly, one of ordinary skill would understand that the scope of the claimed invention is not to be limited by the above explicitly described embodiments but by the claims and equivalents thereof.

What is claimed is:

1. A computer-implemented method for generating a high-quality texture map for a digital human, the method comprising:

generating high-quality images from low-quality images including a low-quality object;

generating partial high-quality images including a high-quality object by replacing the low-quality object within the low-quality images with the high-quality object within the high-quality images; and generating a high-quality texture map for a 3D model corresponding to the high-quality object using the partial high-quality images;

wherein the low-quality images are obtained by rendering a shape of the 3D model and a low-quality texture map for the 3D model.

2. The method of claim 1, wherein the low-quality images indicate key frame images among rendered images.

3. The method of claim 1, wherein the generating of the partial high-quality images includes:

separating the low-quality object from a background of the low-quality images;

separating the high-quality object from a background of the high-quality images; and replacing at least a part of the low-quality object with a corresponding part of the high-quality object.

4. The method of claim 1, wherein the generating of the high-quality texture map for the 3D model includes:

generating the 3D model with a same shape and pose as the high-quality object within the partial high-quality images and with a partial texture map related to the high-quality object;

separating the 3D model into the shape and the partial texture map; and generating a complete texture map by performing inpainting on the partial texture map.

5. The method of claim 1, wherein the generating of the high-quality texture map for the 3D model includes:

generating the high-quality texture map by applying the high-quality object to the low-quality texture map based on a mapping relationship between each part of the low-quality texture map and each part of the high-quality object.

6. A device for generating a high-quality texture map for a digital human comprising:

at least one memory storing computer-executable instructions; and at least one processor, wherein the at least one processor is configured to execute the computer-executable instructions to:

generate high-quality images from low-quality images including low-quality objects;

generate partial high-quality images including a high-quality object by the low-quality object within the low-quality images with a high-quality object within the high-quality images; and generate a high-quality texture map for a 3D model corresponding to the high-quality object using the partial high-quality images;

wherein the low-quality images are obtained by rendering a shape of the 3D model and a low-quality texture map for the 3D model.

7. The device of claim 6, wherein the low-quality images indicate key frame images among rendered images.

8. The device of claim 6, wherein the at least one processor:

separates the low-quality object from a background of the low-quality images;

separates the high-quality object from a background of the high-quality images; and replaces at least a part of the low-quality object with a corresponding part of the high-quality object.

9. The device of claim 6, wherein the at least one processor:

generates the 3D model with a same shape and pose as the high-quality object within the partial high-quality images and with a partial texture map related to the high-quality object;

separates the 3D model into the shape and the partial texture map; and generates a complete texture map by performing inpainting on the partial texture map.

10. The device of claim 6, wherein the at least one processor:

generates the high-quality texture map by applying the high-quality object to the low-quality texture map based on a mapping relationship between each part of the low-quality texture map and each part of the high-quality object.

* * * * *